United States Patent [19]

Sakura et al.

[11] Patent Number: 5,239,160
[45] Date of Patent: Aug. 24, 1993

[54] FIVE-AXIS TABLE FOR LASER BEAM MACHINE TOOL

[75] Inventors: Shunji Sakura, Kyoto; Tatsuya Hirai, Itami; Koichi Saeda, Higashiosaka; Takashi Makino, Akashi; Hiroshi Kawanaka, Moriyama; Masayuki Tamura, Kakogawa, all of Japan

[73] Assignee: Tsubakimoto Chain Co., Osaka, Japan

[21] Appl. No.: 746,031

[22] Filed: Aug. 14, 1991

[30] Foreign Application Priority Data

Aug. 14, 1990 [JP] Japan .................... 2-213646

[51] Int. Cl.⁵ ............................. B23K 26/02
[52] U.S. Cl. .................. 219/121.82; 269/71
[58] Field of Search .......... 219/121.82; 265/71, 265/73

[56] References Cited

U.S. PATENT DOCUMENTS

| | | | |
|---|---|---|---|
| 4,661,678 | 4/1987 | Wavre | 265/71 X |
| 4,687,901 | 8/1987 | Binder et al. | 219/121.67 |
| 5,149,937 | 9/1992 | Babel et al. | 219/121.68 |
| 5,156,382 | 10/1992 | Saeda et al. | 269/71 |

OTHER PUBLICATIONS

Saeda et al., Aug. 1991, 07/745,826.
Saeda et al., Aug. 1991, 07/746,034.

Primary Examiner—C. L. Albritton
Attorney, Agent, or Firm—Howson & Howson

[57] ABSTRACT

In a laser beam machine tool, the problems of power losses, misalignment, high cost, and other problems associated with moving laser heads are eliminated by using a five-axis table in which a biaxial work holder, capable of rotating and tilting a workpiece is mounted on a three-axis table mechanism. In the three-axis table mechanism, an X-axis table is supported on linear motion bearings in overlapping relationship on a Y-axis table, which is, in turn, supported on linear motion bearings on a vertically movable Z-axis table, which is also supported in linear motion bearings. The X-axis, Y-axis and Z-axis tables are driven by servo motors through ball screws so that backlash is avoided.

4 Claims, 11 Drawing Sheets

FIG. 2
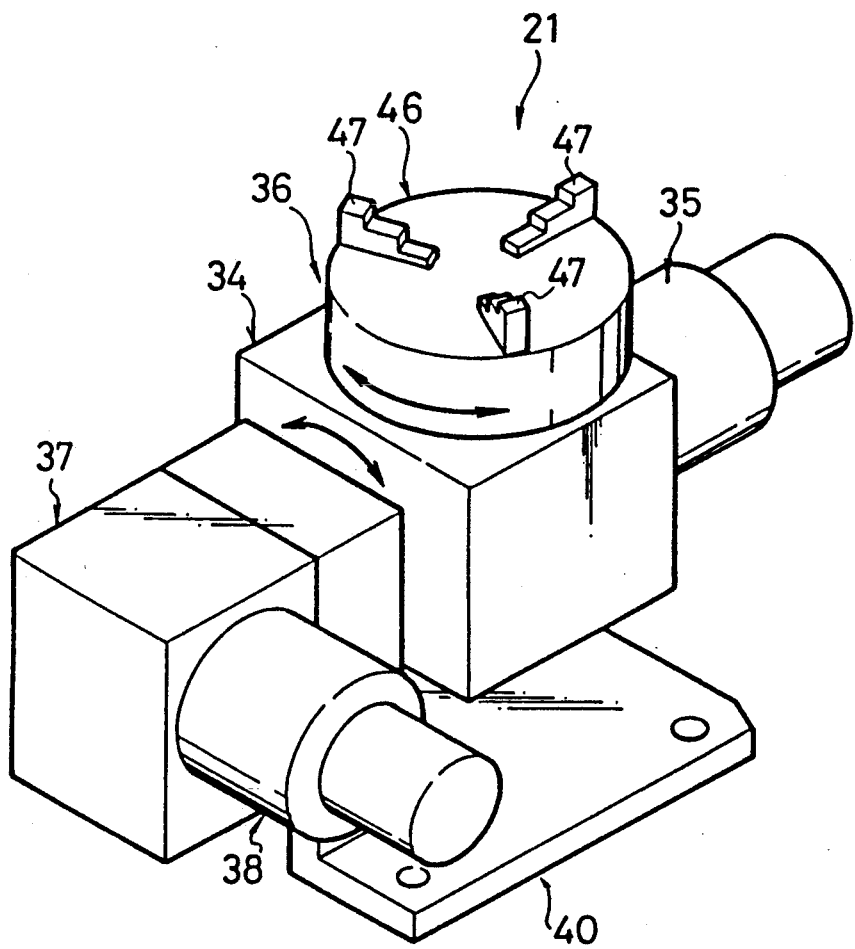
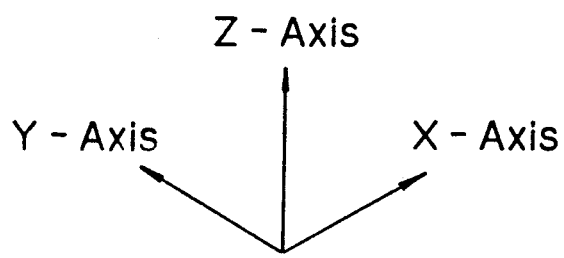

FIVE-AXIS TABLE FOR LASER BEAM MACHINE TOOL

BRIEF SUMMARY OF THE INVENTION

This invention relates to work supports for machine tools and in particular to a five-axis table for a laser beam machine tool, which is capable of moving a workpiece in upward and downward, rightward and leftward, and frontward and rearward directions, and also rotating and inclining the workpiece.

In a typical prior art laser beam machine tool, a laser head for emitting a laser beam is moved by a robot arm in three dimensions, i.e., in upward and downward, rightward and leftward, and frontward and rearward directions. During this movement, a workpiece is machined by the laser beam. The laser beam is conducted from the laser source to the laser head through a plurality of arms connected together in series by a plurality of universal joints. The laser head is connected to a leading one of the arms. Each of the universal joints includes a reflecting mirror, and the arms are provided with tubes for conducting coolant to the reflecting mirrors.

The conventional laser beam machine tool with a moving laser head has a number of disadvantages. First, the reflecting mirrors, universal joints and coolant tubes make the structure of the machine complicated. Second, reflecting mirrors usable in a laser beam machine tool are expensive and contribute significantly to the high cost of the laser beam machine tool as a whole. Third, because plural reflecting mirrors are employed, light loss is multiplied due to absorption and dispersion of the laser beam at the reflecting mirrors, and, consequently, it is not possible to take full advantage of the power of the laser generator in a machine utilizing a moving laser head and reflecting mirrors. Fourth, the service life of the reflecting mirrors is inversely related to the power output of the laser generator. Thus, with higher power lasers, frequent replacement of the reflecting mirrors is required. A fifth disadvantage of the moving laser beam head is that misalignment of the optical axis of the laser beam can easily occur, especially when multiple mirrors are used. Consequently it is difficult to insure high machining accuracy. A sixth disadvantage is that, with a conventional laser beam machine, it is not possible to achieve continuous rotation of the laser head. Therefore, much time and labor is required in order to machine a surface of revolution in a workpiece.

The principal objects of the invention are to overcome the above-mentioned disadvantages of laser machine tools of the type having moving laser heads.

The invention addresses the foregoing problems by the use of a five-axis table which comprising a biaxial rotating work-holder and a three-axis moving table mechanism. The biaxial rotating work holder comprises a first rotatable shaft, a speed reducer mounted on the first rotatable shaft, said speed reducer having an input shaft and an output shaft rotatable respectively on axes which cross each other, a motor for rotating the input shaft, and a work support mounted on the output shaft. The axis of the output shaft also crosses, and is preferably perpendicular to, and intersecting with, the axis of the first rotatable shaft. The three-axis moving table mechanism comprises a Z-axis table movable in a Z-axis direction, and X-axis and Y-axis tables movable respectively in X-axis and Y-axis directions. The X, Y and Z axis directions are mutually orthogonal, and the X-axis and Y-axis tables are supported on the Z-axis table with one of the X-axis and Y-axis tables being supported on and above the other, in overlapping relationship, so that one of the X and Y-axis tables is an upper table. The biaxial rotating work holder is mounted on the upper one of the X-axis and Y-axis tables.

A workpiece placed on the work support is moved in rightward and leftward directions (the X-axis direction), frontward and rearward directions (the Y-axis direction), and upward and downward directions (the Z-axis directions) by the movement of the X-axis, Y-axis, and Z-axis tables. Furthermore, the workpiece is rotated by rotation of the output shaft of the speed reducer, and is also inclined by the rotation of the first rotatable shaft. Accordingly, complex movement of the workpiece based on five axes can be achieved with respect to a fixed laser head of a laser beam machine, in order to machine a workpiece to a desired shape.

Further objects, details and advantages of the invention will be apparent from the following detailed description, when read in conjunction with the drawings.

BRIEF DESCRIPTION OF THE DRAWINGS

FIG. 2 is a perspective schematic view of the biaxial rotating table mechanism which forms part of the machine tool of FIG. 1;

DETAILED DESCRIPTION

Figure 13:
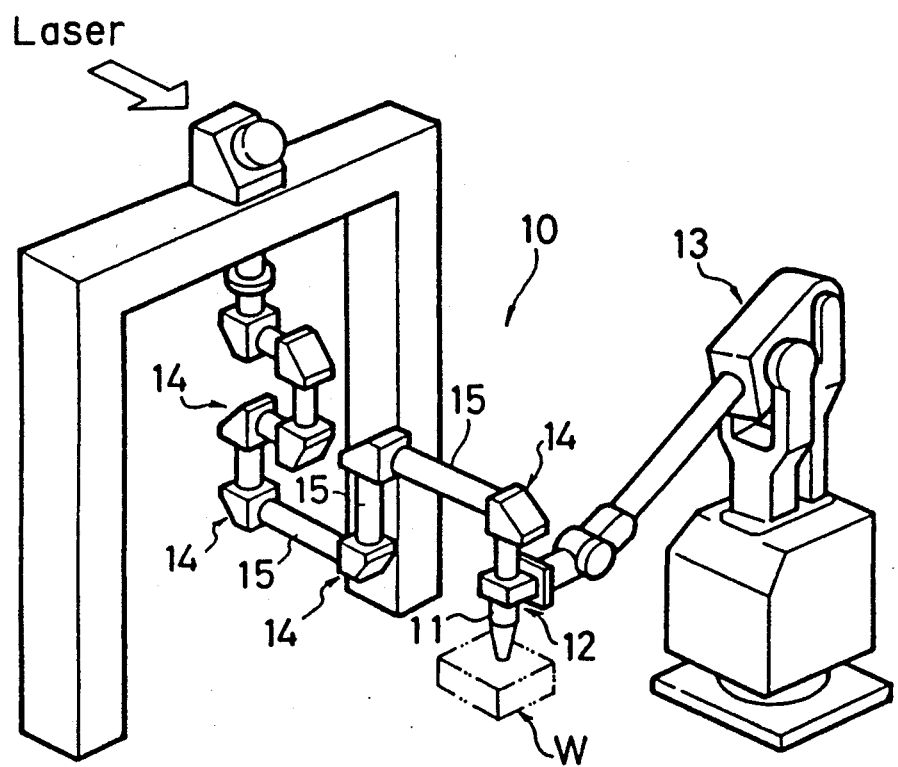
FIG. 13 is a schematic perspective view of a conventional laser beam machine tool in accordance with the prior art.

FIG. 13 shows a laser beam machine 10 in accordance with the prior art. In the laser beam machine 10, a light condenser unit 12, having a laser head 11 for emitting a laser beam, is movable by a robot 13 in three-dimensions, i.e., upward and downward, rightward and leftward, and frontward and rearward. During this movement, a workpiece W is machined by the laser beam. A plurality of arms 15 are connected together in series by a plurality of universal joints 14 The light condenser unit 12 is connected to a leading one of these arms 15. The laser beam, generated by a fixed a laser generator (not shown), is transmitted through a plurality of reflecting mirrors (not shown) provided in joints connecting the arms 15 together and to the light condenser unit 12. Coolant passages (not shown) for cooling the reflecting mirrors are provided along arms 15. As will be apparent from FIG. 13, the structure required for a practical, accurate machine tool of the moving laser head type is complex and expensive.

Figure 1:
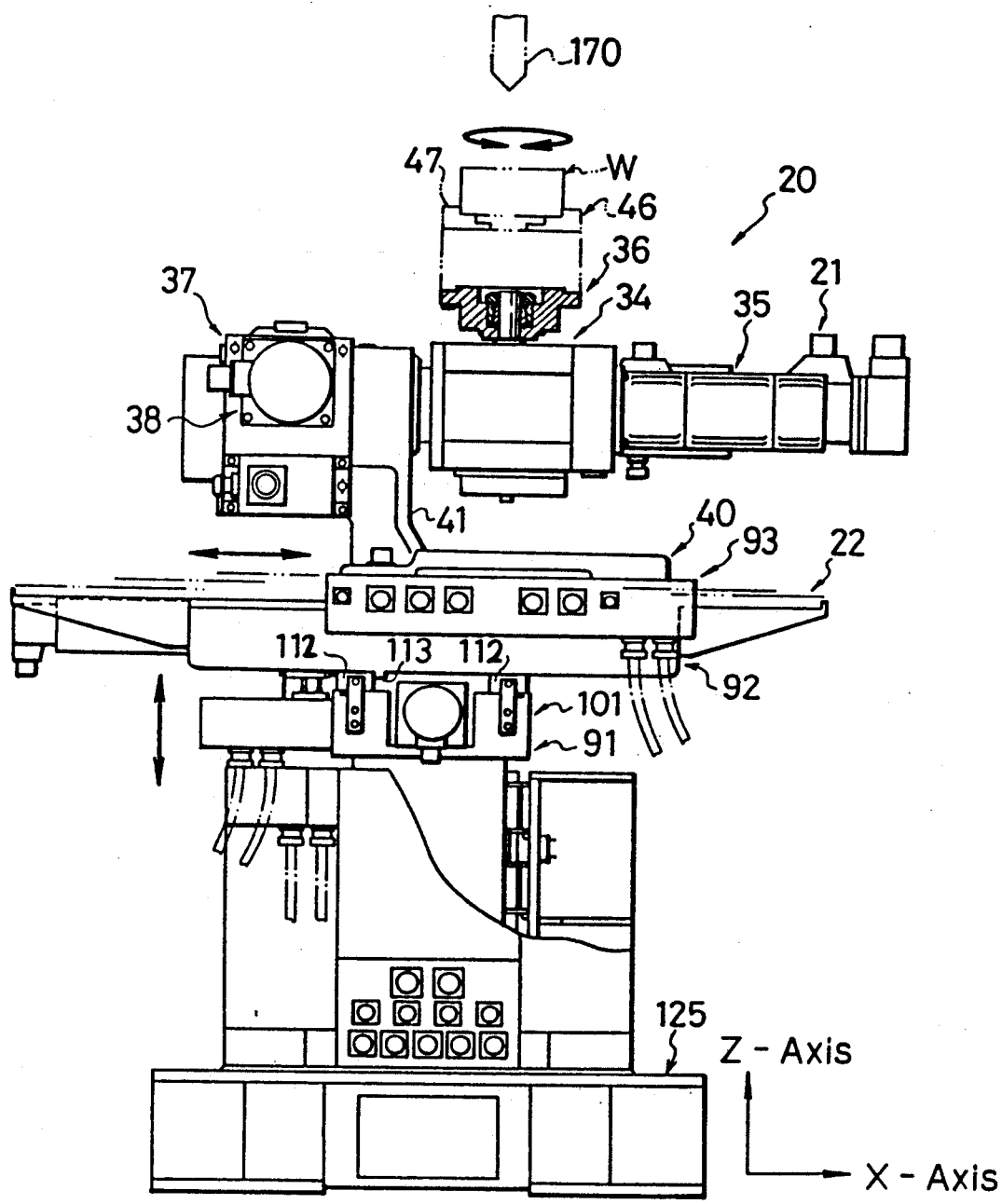
FIG. 1 is a front elevational view, partly in section, showing the five-axis table in accordance with the invention.

Referring to FIG. 1, reference numeral 20 generally designates a five-axis table for a laser beam machine. The five-axis table 20 is designed to move a workpiece W, to be machined by a laser beam machine, in upward and downward, rightward and leftward, and frontward and rearward directions, and simultaneously to rotate and incline the workpiece. The five-axis table 20 generally comprises a biaxial rotating work holder 21 and a three-axis moving table mechanism 22.

Referring to FIGS. 2 to 5, the biaxial rotating table mechanism 21 includes: a first rotating shaft 31 for tilting the workpiece W to inclined positions; a first speed reducer 34, mounted on shaft 31, and including an input shaft 32 (FIG. 4) and an output shaft 33 (FIGS. 3, 4) connected together with their axes of rotation crossing in orthogonal relationship to each other; a first servomotor 35 for rotating the input shaft 32 of the first speed reducer 34, a bed 36 (FIG. 3), connected to an output shaft 33 of the first speed reducer 34, for holding the chuck or other workpiece-supporting device; a second speed reducer 37 connected to rotating shaft 31; and a second servomotor 38 for rotating shaft 31 through the second speed reducer 37. The biaxial rotating table mechanism 21 thus constructed is mounted on the three-axis moving table mechanism 22 which will be hereinafter described in detail.

Figure 3:
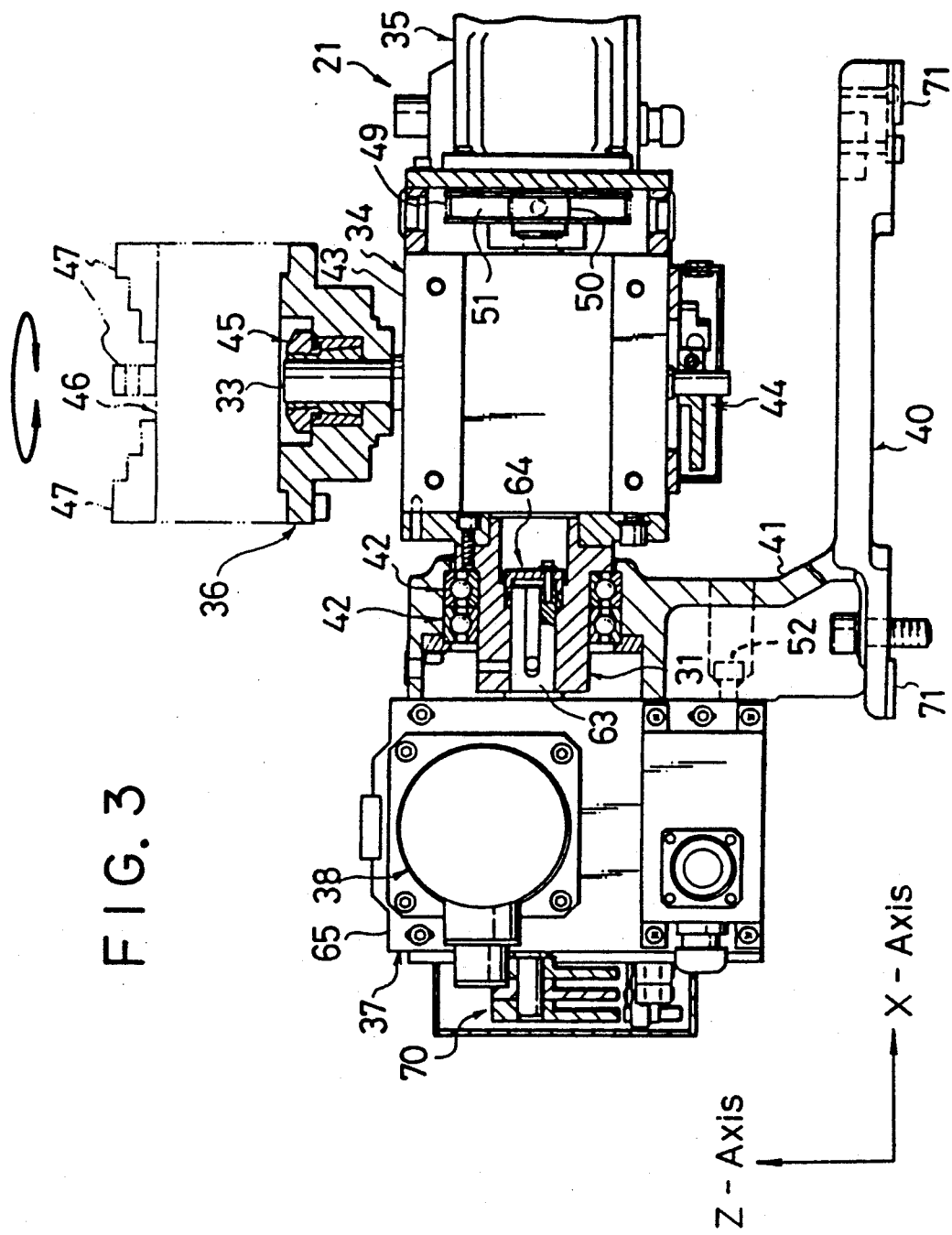
FIG. 3 is a fragmentary front elevational view, partly in section, showing details of the biaxial rotating table mechanism.

As shown in FIG. 3, first rotating shaft 21 is hollow, and is rotatably supported by a pair of bearings 42 on an upwardly extending portion 41 of an L-shaped frame 40. A horizontally extending element of frame 40 is provided with a pair of projections 71 on its underside.

The first speed reducer 34 is fixed to the right end of shaft 31 as seen in FIG. 3.

Output shaft 33 of speed reducer 34 and the first rotatable shaft 31, on which speed reducer 34 is mounted, are arranged in orthogonal relationship, with their axes preferably intersecting each other.

Input shaft 32 (FIG. 4) is provided with a worm (not shown), and output shaft 33 is provided with a cam follower (not shown) from which a plurality of needle rollers (not shown) project radially. The worm of input shaft 32 meshes with the needle rollers of the cam follower of output shaft 33. Thus, the input shaft 32 and the output shaft 33 are connected together in driving relationship, with multiple turns of the input shaft required to effect a full turn of the output shaft so that a speed reduction is effected. To eliminate backlash in speed reducer 34, the axis of input shaft 32 is positioned slightly nearer to the axis of shaft 34 than the position in which it would be situated for normal meshing, so that the needle rollers preload the worm. As a result of the preloading of the worm, output shaft 33 can be rotated with no backlash in relation to input shaft 32.

As shown in FIG. 3, output shaft 33 extends vertically and projects both upwardly and downwardly from housing 43 of speed reducer 34. Between the lower end of the output shaft 33 and the lower surface of the housing 43 there is provided an origin setting mechanism 44 for setting and adjusting a rotational origin position of bed 36.

Bed 36 is connected to the upper end of output shaft 33 of speed reducer 34 by means of a collet mechanism 45 so that no key and key slot are required to lock the bed to the shaft. A conventional chuck 46, having three stepped jaws 47 for grasping the workpiece W (FIG. 1, 5), is bolted to bed 36.

Figure 4:
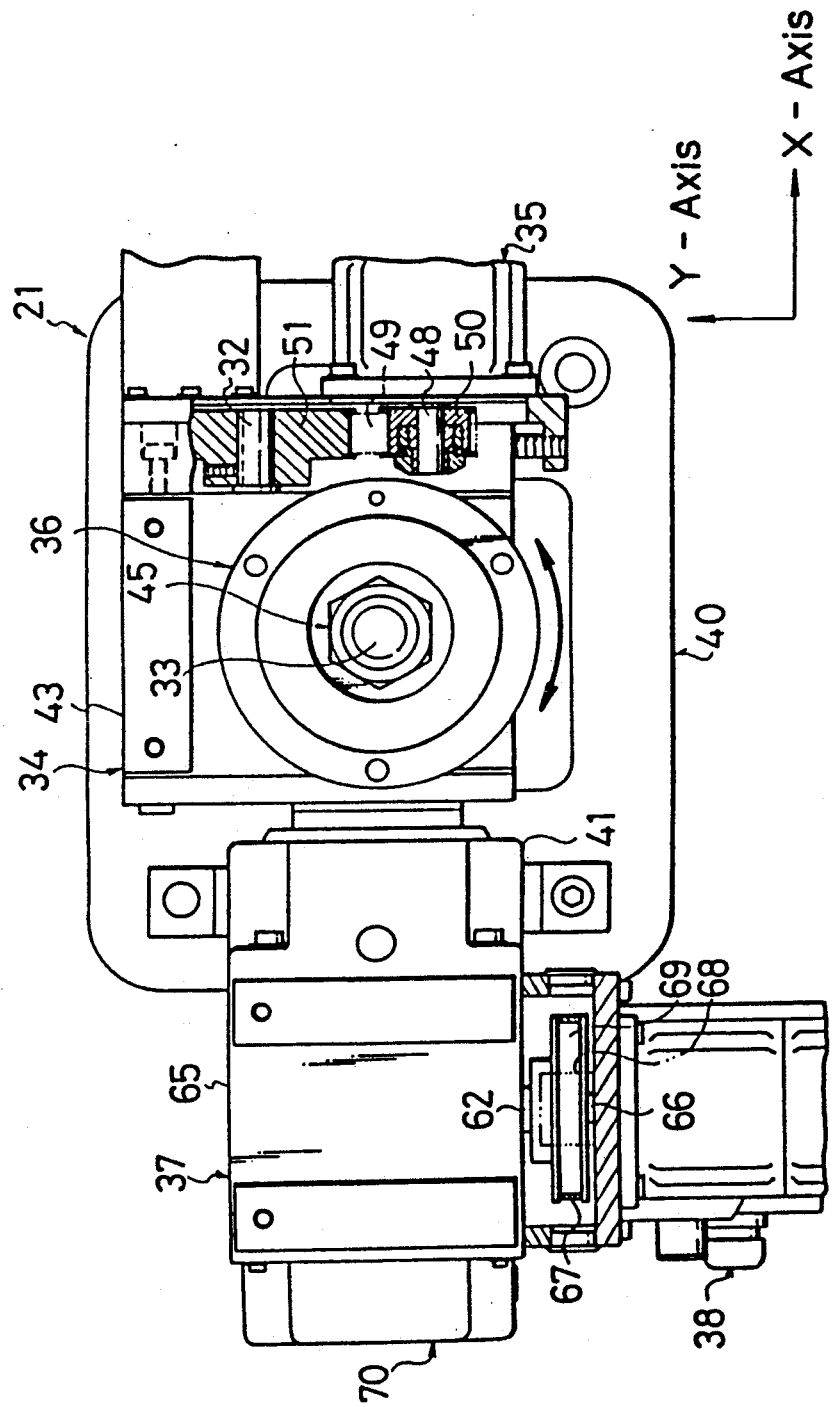
FIG. 4 is a fragmentary top plan view, partly in section, of the mechanism of FIG. 3.
Figure 5:
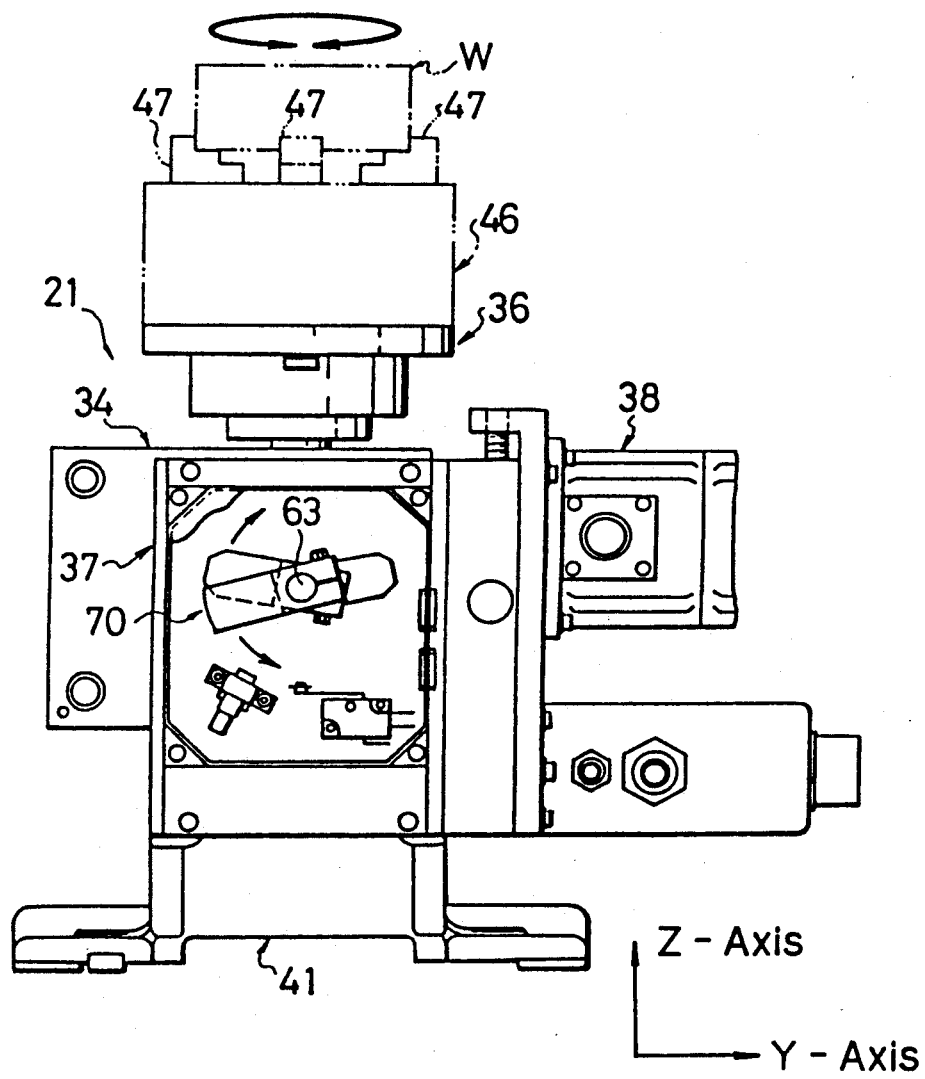
FIG. 5 is a partly cut-away left side elevational view of the mechanism of FIG. 3.

A first servo motor 35 is mounted on a right side surface of housing 43 of speed reducer 34 as viewed in FIG. 3. As shown in FIG. 4, input shaft 32 of speed reducer 34 is connected through a toothed belt 49 and toothed pulleys 50 and 51 to an output shaft 48 of servo motor 35. Although not specifically shown in the drawings, the teeth of belt 49 and the teeth of pulleys 50 and 51 have tooth profiles establishing a tight meshing relationship of the belt with the pulleys so that backlash is almost completely eliminated. All the parts assembled with and carried by rotating shaft 31, i.e., speed reducer 34, bed 36, servo motor 35, etc. are preferably situated in relation to one another so that the center of gravity of the assembly lies substantially on an axis of shaft 31.

As shown in FIGS. 3 and 4, second speed reducer 37 is fixed by bolts 52 (FIG. 3) to a left side surface of upwardly extending portion 41 of frame 40.

Speed reducer 37 has substantially the same structure as that of speed reducer 34. As shown in FIGS. 3 and 4, speed reducer 37 includes an input shaft 62 and an output shaft 63. As in the case of speed reducer 34, the distance between the axis of input shaft 62 and the axis of output shaft 63 is slightly less than the normal spacing so that the needle rollers on output shaft 63 preload the worm on input shaft 62 to eliminate backlash. Output shaft 63 is shown keyed to shaft 31 by a joint 64, although frictional connections can be used alternatively.

Second servo motor 38 is fixed to the front side surface (lower side surface as viewed in FIG. 4) of the housing 65 of speed reducer 37. As shown in FIG. 4, input shaft 62 of speed reducer 37 is connected, through a toothed belt 67 and toothed pulleys 68 and 69, to the output shaft 66 of servo motor 38. Again, although not specifically shown, the teeth of belt 67 and the teeth of pulleys 68 and 69 have tooth profiles establishing a tight meshing relationship of the belt with the pulleys so that backlash is almost completely eliminated.

As shown in FIG. 3, output shaft 63 of speed reducer 37 projects horizontally in opposite directions from right and left side surfaces of housing 65 of the speed reducer 37. Between the left end of output shaft 63 and the left side surface of the housing 65 there is provided an angle setting mechanism 70 for setting the origin and a range of inclination of bed 36.

In the operation of the biaxial rotating table mechanism 21, a workpiece W is grasped and held by chuck 46. When servo motor 35 is operated, torque is transmitted through motor output shaft 48, pulley 50, toothed belt 49, pulley 51, input shaft 32 of speed reducer 34, the worm (not shown) mounted on the input shaft 32, the follower (not shown) mounted on output shaft 33, and output shaft 33, to bed 36. As a result, bed 36 is rotated, about the axis of the output shaft 33. As a result of the speed reduction effected by speed reducer 34, bed 36 is rotated at a speed lower than that of output shaft 48 of servo motor 35, and lower than that of input shaft 32 of the speed reducer. The biaxial rotating table mechanism 21 can rotate the workpiece W in the horizontal plane, provided that shaft 33 is vertical.

When servo motor 38 is operated, the torque which it produces is transmitted through output shaft 66, pulley 68, toothed belt 67, pulley 69, input shaft 62 of speed reducer 37, the worm mounted on the input shaft 62, the follower mounted on output shaft 63 of speed reducer 37, and output shaft 63, to shaft 31, thereby rotating the rotating shaft 31. Accordingly, speed reducer 34 and bed 36 are tilted together to an inclined condition. In this operation, as the rotational speed of servo motor 38 is reduced speed reducer 37, bed 36 is tilted at a speed much lower than the rotating speed of servo motor 38.

In this manner, work-supporting bed 36 can be tilted by servo motor 38 either before, after, or during rotation of bed 36 by servo motor 35.

While, in the preferred embodiment, shaft 31 is rotated by servo motor 38 to tilt work-supporting bed 36 to a desired inclination, servo motor 38 can be replaced by a manual crank or knob (not shown) adapted to be manually rotated by an operator in order to effect tilting of the work-supporting bed 36. Alternatively, servo motor 38 and speed reducer 37 can be replaced by a swing lever (not shown) or a manually operable handle directly connected to the left end of shaft 31 (as viewed in FIG. 3), so that an operator can effect direct manual tilting of the work-supporting bed.

The three-axis moving table mechanism 22 includes a Z-axis table 91 movable in a vertical direction as viewed in FIG. 1 (which direction will be hereinafter referred to as the "Z-axis direction"). It also comprises a Y-axis table 92, supported on the Z-axis table 91 and movable horizontally in a direction perpendicular to the plane in which FIG. 1 is drawn. The direction of movement of the Y-axis table will be referred to as the "Y-axis direction". The three-axis table also comprises an X-axis table 93, movable horizontally in a direction parallel to the plane in which FIG. 1 is drawn, which direction will be referred to as the "X-axis direction". The biaxial rotating table mechanism 21 is mounted on the X-axis table 93, and is moved in the X-axis, Y-axis and Z-axis directions by the three-axis moving table mechanism 22.

Figure 6:
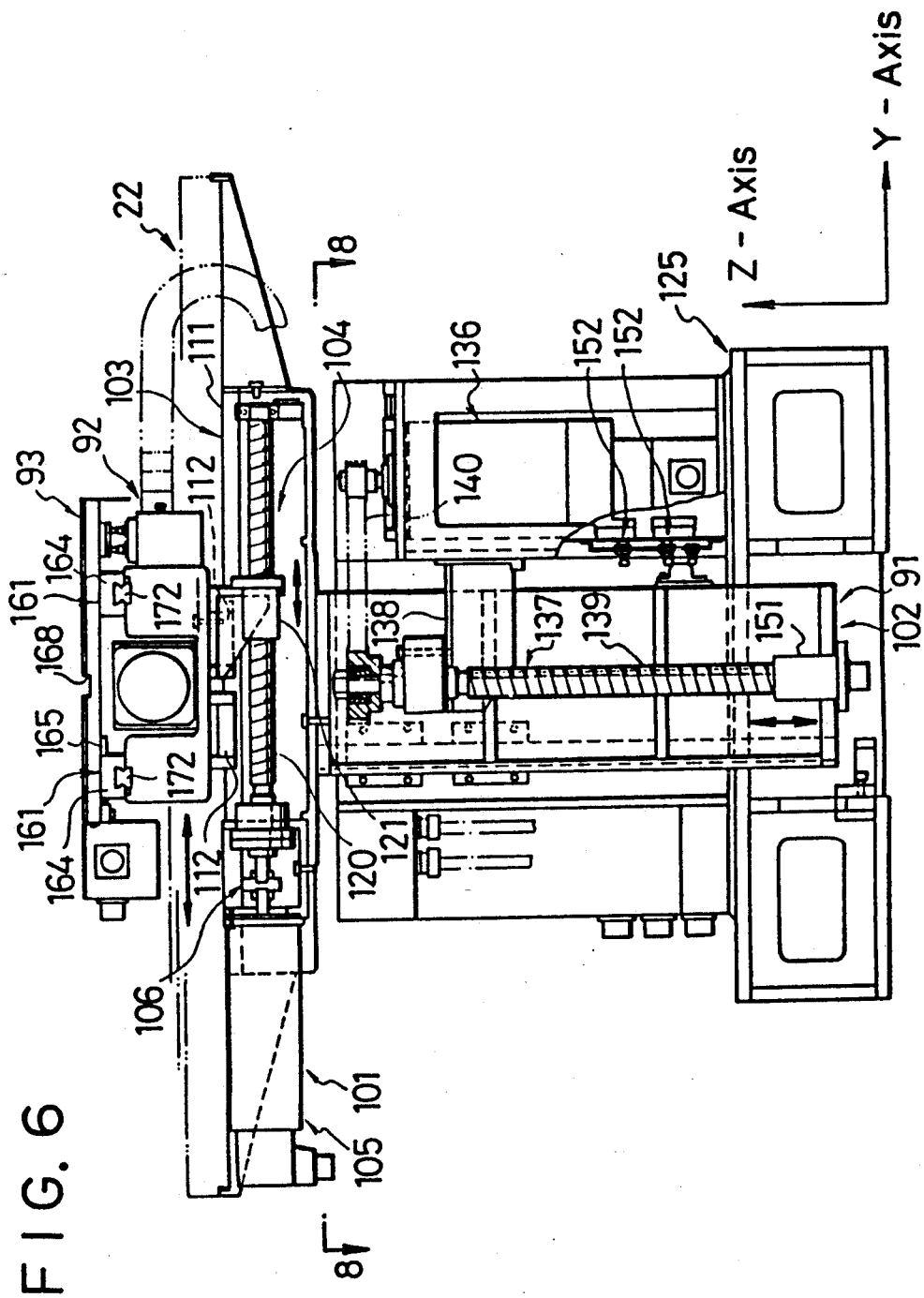
FIG. 6 is a right side elevational view, partly in section, of the three-dimensional moving table mechanism which forms part of the machine tool of FIG. 1.

As shown in FIG. 6, Z-axis table 91 comprises a frame 101 which extends in the Y-axis direction, and a frame 102 which extends vertically, i.e. in the Z-axis direction. Therefore, the Z-axis table has a generally T-shaped configuration.

Figure 7:
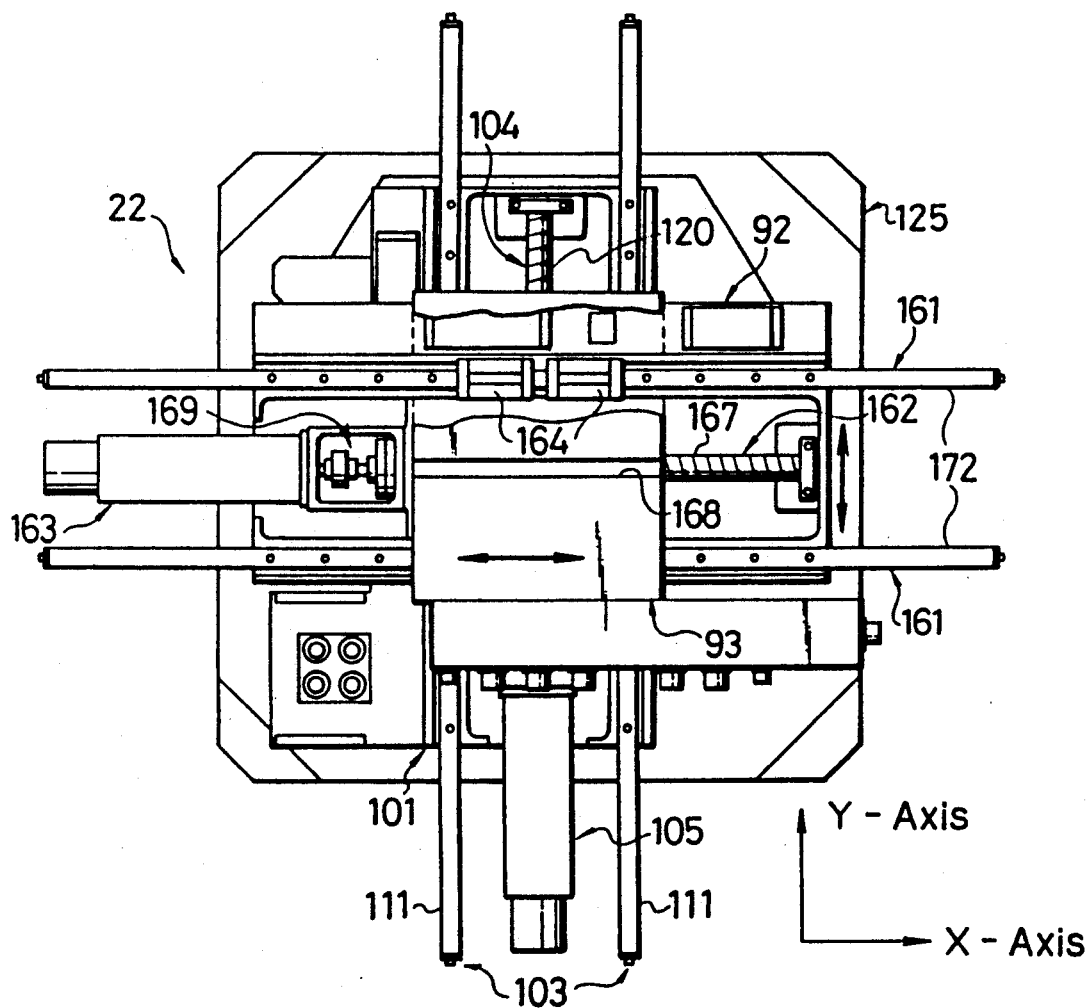
FIG. 7 is a partially cut-away top plan view of the mechanism of FIG. 6.

As shown in FIGS. 6 and 7, frame 101 is provided with linear motion bearings 103 for supporting Y-axis table 92 and guiding its movement in the Y-axis direction. A single ball screw 104, extending in the Y-axis direction, is driven by a servo motor 105 through a coupling 106 designed to eliminate backlash.

As shown in FIG. 6, each linear motion bearing 103 comprises a rail 111 supported on frame 101, and two bearing bodies 112 secured to the underside of Y-axis table 92. The total number of the bearing bodies 112 is four. Two of the bearing bodies 112 are seen in FIG. 6, and one of the bearing bodies 112 is shown in detail in FIG. 9.

Figure 11:
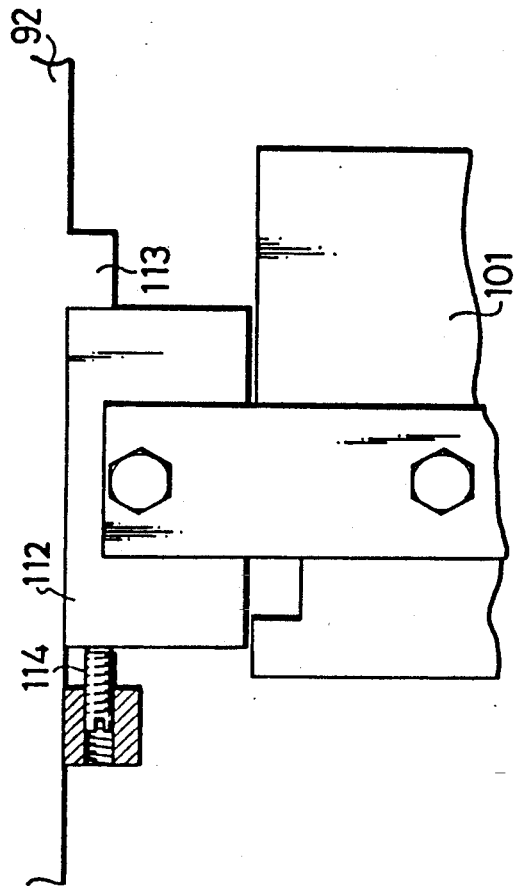
FIG. 11 is a fragmentary enlarged elevational view, partly in section, showing a Y-axis bearing body in its mounted condition.

As shown in FIG. 11, each bearing body 112 is urged horizontally, by a bolt 114, against a projection 113 formed on the underside of Y-axis table 92.

Figure 10:
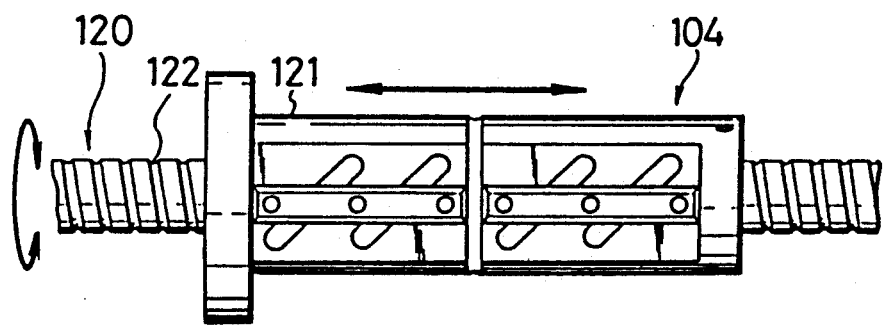
FIG. 10 is a fragmentary enlarged elevational view of the Y-axis ball screw from the mechanism of FIG. 6.

Referring to FIGS. 6 and 10, ball screw 104 comprises a screw shaft 120 having a helical thread groove 122, and a ball nut 121 threaded on screw shaft 120. Screw shaft 120 is rotatably supported in bearings provided on frame 101. Ball nut 121 is fixed to the lower surface of table 92.

When Y-axis servo motor 105 is operated, screw shaft 120 is rotated through the coupling 106, and as a result, the ball nut 121 is moved on the screw shaft 120. As a result of movement of the ball nut 121, table 92 is moved in the Y-axis direction, being guided by the Y-axis linear motion bearings 103. The limits of the range of movement of table 92 are set by sensors (not shown)

Figure 8:
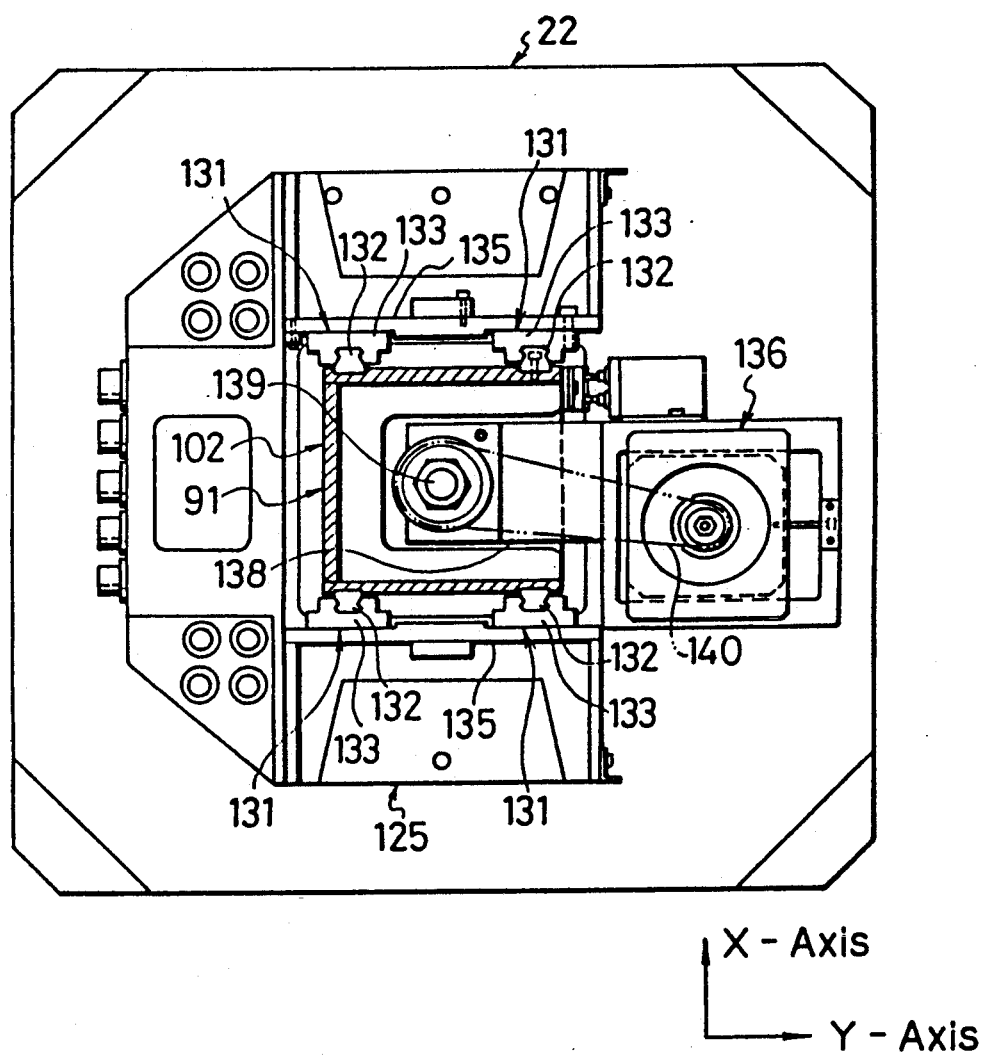
FIG. 8 is a horizontal section taken on plane 8—8 of FIG. 6.

Referring now to FIGS. 6 and 8, reference numeral 125 designates a fixed frame having a pair of upstanding plates 135 opposed to each other in parallel, spaced relationship. Between frame 102 and upstanding plates 135 there are provided four, parallel, linear motion bearings 131 extending in the Z-axis direction. Each of these linear motion bearings 131 comprises a vertically extending rail 132 fixed to frame 102 and a bearing body 133 fixed to an upstanding plate 135.

As shown in FIG. 6, the fixed frame 125 is provided with a servo motor 136 and a single ball screw 137 extending in the Z-axis direction.

A screw shaft 139 of ball screw 137 is rotatably supported by a bracket 138 of fixed frame 125. Screw shaft 139 is connected at its upper end, through a toothed belt 140, to a Z-axis servo motor 136. A ball nut 151 threadedly engaged with screw shaft 139 is fixed to a lower end of frame 102.

When Z-axis servo motor 136 is operated, screw shaft 139 is rotated by toothed belt 140. As a result, ball nut 151 is raised or lowered on the screw shaft 139, depending on the direction of rotation of motor 136. By the movement of the ball nut 151, the Z-axis table 91 is raised or lowered in the Z-axis direction, being guided by linear motion bearings 131. The limits of the range of movement of Z-axis table 91 are set by sensors 152 provided on fixed frame 125.

As mentioned above, Y-axis table 92 is guided on frame 101 of Z-axis table 91 by two linear motion bearings 103 having four bearing bodies 112 which are fixed to the underside of Y-axis table 92.

As shown in FIGS. 6 and 7, on an upper surface of the Y-axis table 92, there are provided two X-axis linear motion bearings 161, for supporting X-axis table 93 and guiding the movement of table 93 in the X-axis direction. Also provided on the upper surface of table 92 are a single X-axis ball screw 162 for moving the X-axis table 93, and an X-axis servo motor 163 for operating ball screw 162. X-axis ball screw 162 and X-axis servo motor 163 are connected together by a coupling 169 designed to eliminate backlash.

Figure 12:
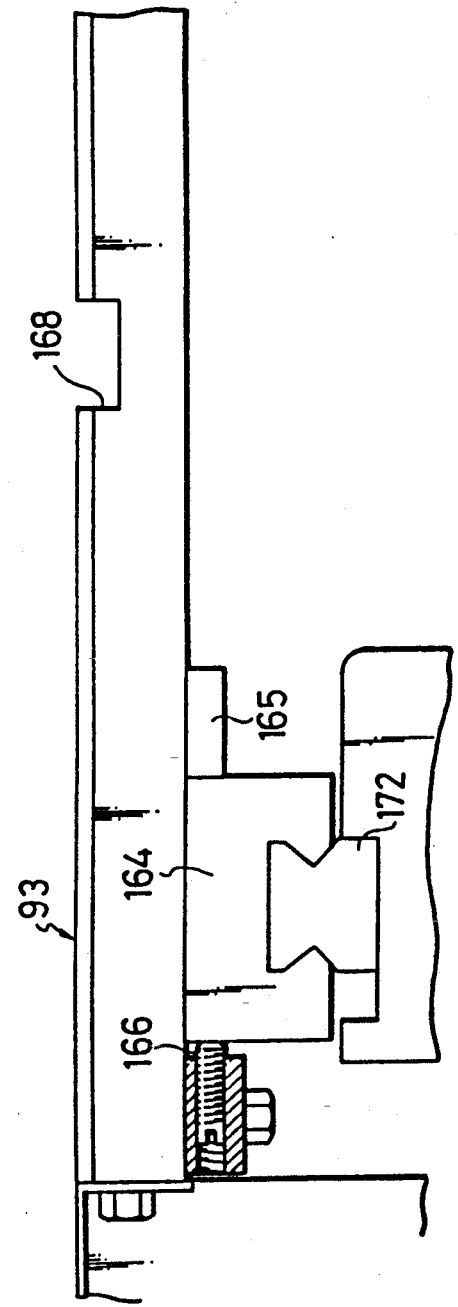
FIG. 12 is a fragmentary enlarged elevational view, partly in section, showing an X-axis linear motion bearing.

The X-axis linear motion bearings comprise two parallel rails 172, each fixed to the upper surface of Y-axis table 92. Each of the X-axis bearings also comprises two bearing bodies 164 fixed to the underside of X-axis table 93. As shown in FIGS. 6 and 12, each bearing body 164 is urged horizontally, by a bolt 166, against a projection 165 formed on the underside of X-axis table 93.

Screw shaft 167 of the X-axis ball screw 162 is rotatably supported on the upper surface of Y-axis table 92, and a ball nut (not shown), threadedly engaged with the screw shaft 167, is fixed to the underside of X-axis table 93.

Thus, X-axis table 93 is supported on Y-axis table 92 by two X-axis linear motion bearings 161 having four bearing bodies 164 fixed to the underside of the X-axis table.

As previously mentioned, and as shown in FIG. 1, the biaxial rotating table mechanism 21 is mounted on an upper surface of X-axis table 93. The upper surface of the X-axis table 93 is formed with a single groove 168

(FIGS. 6 and 7) extending in the X-axis direction and adapted to engage the two projections 71 (FIG. 3) provided on the underside of the horizontally extending part of frame 40 of the biaxial rotating table mechanism 21. When projections 71 of frame 40 are engaged with groove 168 of X-axis table 93, rotatable shaft 31 of the biaxial rotating table mechanism 21 extends in the X-axis direction.

When X-axis servo motor 163 is operated, screw shaft 167 is rotated through coupling 169. The ball nut (not shown) which is threadedly engaged with screw shaft 167 moves along screw shaft 167. As a result of the movement of the ball nut, X-axis table 93 is moved in the X-axis direction, being guided by the two X-axis linear motion bearings 161. The limits of the range of movement of X-axis table 93 are set by sensors (not shown).

The operation of the three-dimensional moving table mechanism 22 as a whole is as follows.

When Z-axis servo motor 136 is operated, all three of the Z-axis, Y-axis and X-axis tables 91, 92 and 93 are moved together in the Z-axis direction relative to fixed frame 125. Whether the tables are raised or lowered depends on the direction of operation of the Z-axis servo motor. When Y-axis servo motor 105 is operated, both the Y-axis and X-axis tables 92 and 93 are moved in the Y-axis direction relative to Z-axis table 91. When the X-axis servo motor 163 is operated, X-axis table 93 only is moved in the X-axis direction relative to Y-axis table 92.

When all three of the X-axis, Y-axis and Z-axis servo motors 163, 105 and 136 are operated simultaneously, the X-axis, Y-axis and Z-axis tables 93, 92 and 91 are moved simultaneously in predetermined directions on their respective axes. As a result, by appropriate control of the servo motors, X-axis table 93 can be moved in any desired path in three dimensions to a desired final position.

Although X-axis table 93 is supported on Y-axis table 92 in the above-described preferred embodiment, in an alternative embodiment, the Y-axis table can be provided on the X-axis table. In this alternative embodiment, the biaxial rotating table mechanism 21 would be provided on the Y-axis table 92.

Figure 9:
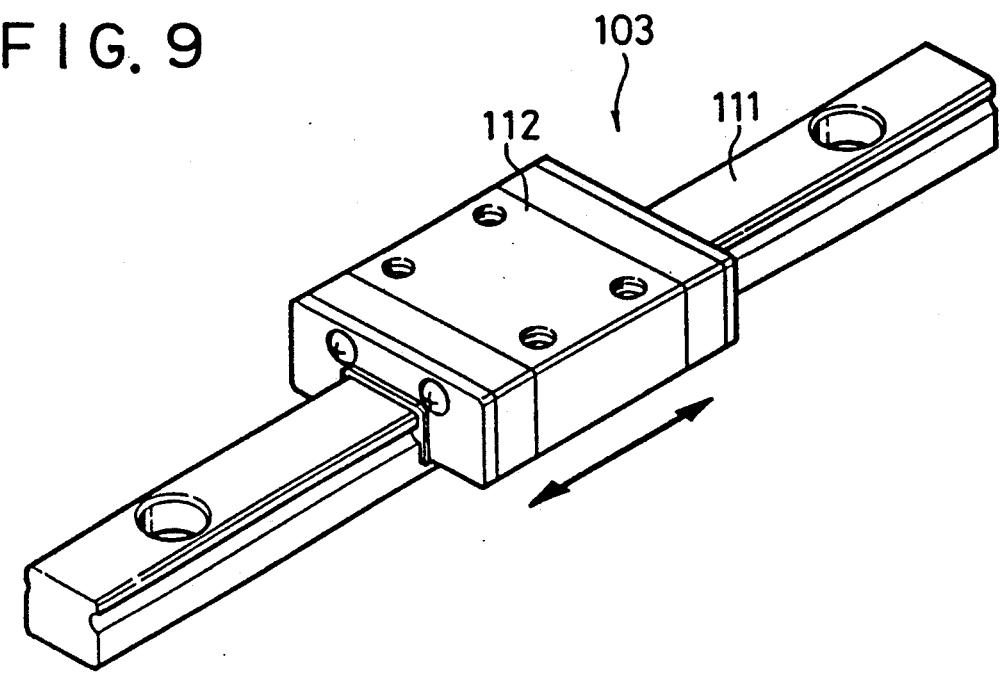
FIG. 9 is a fragmentary enlarged perspective view of one of the Y-axis linear motion bearings from the mechanism of FIG. 6.

Although not shown in detail, the X-axis and Z-axis linear motion bearings 161 and 131 have substantially the same structure as that of the Y-axis linear motion bearing 103 shown in FIG. 9. Similarly, the X-axis and Z-axis ball screws 162 and 137 have substantially the same structure as that the Y-axis ball screw 104 shown in FIG. 10.

The overall operation of the five-axis table 20 will be described.

When a workpiece W is secured to bed 36 by means of a chuck or other suitable clamp or fastener, the X-axis, Y-axis and Z-axis servo motors 163, 105 and 136 are operated simultaneously or selectively to move at one or more of the X-axis, Y-axis and Z-axis tables 93, 92 and 91 in predetermined directions, so as to position the biaxial rotating table mechanism 21 under laser head 170 (FIG. 1) of a laser beam machine. First and second servo motors 35 and 38 of the biaxial rotating table mechanism 21 are operated simultaneously or one at a time to rotate and/or tilt work-supporting bed 36.

Accordingly, workpiece W is moved on the basis of five axes by the servo motors 35, 38, 105, 136 and 163 of the five-axis table 20. Workpiece W is machined by laser head 170 during such movement of workpiece W on one or more of the five axes.

Servo motors 35, 38, 105, 136 and 163 may be operated under the control of a computer in a predetermined manner in accordance with a stored program, so that a workpiece can be machined automatically to a desired shape. In this way, multiple workpieces can be rapidly machined, one after another, to the same shape with high accuracy and consistency.

The five-axis table in accordance with the invention, is capable of moving a workpiece in upward and downward, frontward and rearward, and rightward and leftward directions, as well as rotating it and tilting it to an inclined condition. Accordingly, a number of important advantages are realized. First, since the laser head of the laser beam machine need not be moved, the structure of the laser beam machine can be greatly simplified. Second, because of the simplification of the structure of the laser beam machine, the cost of the laser beam machine can be reduced. Third, since the laser beam can remain stationary, the optical system of the laser beam machine can be made much simpler and easier to maintain. Fourth, the simplification of the optical system of the laser beam machine, greatly reduces losses in power so that advantage can be taken of the full power output of the laser generator. Fifth, since the laser head of the laser beam machine need not be moved, misalignment of the axis of the laser optics can be significantly reduced with a resulting improvement in work machining accuracy. Sixth, since the work can be rotated continuously at high speeds by work-supporting bed 36, a surface of revolution can be easily machined by the laser beam. Seventh, since each of the X-axis, Y-axis and Z-axis tables is operated by a servo motor through a ball screw mechanism, the tables can be reciprocatingly moved without significant backlash, and be stopped with precision at predetermined positions. Finally, since each of the X-axis, Y-axis and Z-axis tables is guided by linear motion bearings, the tables can be moved linearly with very low friction.

Numerous modifications to the apparatus other than those specifically described herein can be made without departing from the scope of the invention as defined in the following claims.

We claim:

1. A five axis table for a laser beam machine tool, comprising a biaxial rotating work-holder and a three-axis moving table mechanism, wherein:

the biaxial rotating work holder comprises a first rotatable shaft, a speed reducer mounted on said first rotatable shaft, said speed reducer having an input shaft and an output shaft rotatable respectively on axes which cross each other, motor means for rotating said input shaft, and a work-support mounted on said output shaft; and said three-axis moving table mechanism comprising a Z-axis table movable in a Z-axis direction, and X-axis and Y-axis tables movable respectively in X-axis and Y-axis directions, wherein said X, Y and Z axis directions are mutually orthogonal, said X-axis and Y-axis tables being supported on said Z-axis table with one of said X-axis and Y-axis tables being supported on and above the other in overlapping relationship so that one of said X and Y-axis tables is an upper table;

said biaxial rotating work holder being mounted on the upper one of said X-axis and Y-axis tables.

2. The five axis table as defined in claim 1 wherein said three axis moving table mechanism further comprises linear motion bearing means for guiding movement of each of said X, Y and Z-axis tables.

3. The five axis table as defined in claim 1, wherein said three axis moving table mechanism further comprises ball screw means for moving each of said X, Y and Z-axis tables.

4. The five axis table as defined in claim 3 wherein said three axis moving table mechanism further comprises linear motion bearing means for guiding movement of each of said X, Y and Z-axis tables.

* * * * *